United States Patent
van Os et al.

(10) Patent No.: US 7,865,834 B1
(45) Date of Patent: Jan. 4, 2011

(54) MULTI-WAY VIDEO CONFERENCING USER INTERFACE

(75) Inventors: Marcel van Os, San Francisco, CA (US); Peter T. Westen, Mountain View, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 766 days.

(21) Appl. No.: 10/877,509

(22) Filed: Jun. 25, 2004

(51) Int. Cl.
*G06Q 10/00* (2006.01)
*G06F 3/033* (2006.01)
*H04N 7/24* (2006.01)

(52) U.S. Cl. .......... 715/756; 715/850; 715/782; 348/14.12

(58) Field of Classification Search ......... 715/751–759, 715/850, 782; 709/204–207; 345/582, 426; 348/14.16
See application file for complete search history.

(56) References Cited

U.S. PATENT DOCUMENTS

| | | | |
|---|---|---|---|
| 5,459,529 A | 10/1995 | Searby et al. | |
| 5,500,671 A * | 3/1996 | Andersson et al. | 348/14.1 |
| 5,534,917 A | 7/1996 | MacDougall | |
| 5,594,859 A | 1/1997 | Palmer et al. | |
| 5,687,306 A | 11/1997 | Blank | |
| 5,748,775 A | 5/1998 | Tsuchikawa et al. | |
| 5,781,198 A | 7/1998 | Korn | |
| 5,812,787 A | 9/1998 | Astle | |
| 5,831,620 A * | 11/1998 | Kichury, Jr. | 345/419 |
| 5,854,893 A | 12/1998 | Ludwig et al. | |
| 5,877,769 A * | 3/1999 | Shinohara | 345/419 |
| 5,880,733 A * | 3/1999 | Horvitz et al. | 715/850 |
| 5,914,748 A | 6/1999 | Parulski et al. | |
| 5,923,791 A | 7/1999 | Hanna et al. | |
| 5,973,724 A | 10/1999 | Riddle | |
| 6,237,025 B1 | 5/2001 | Ludwig et al. | |
| 6,351,762 B1 | 2/2002 | Ludwig et al. | |
| 6,400,374 B2 | 6/2002 | Lanier | |
| 6,424,373 B1 * | 7/2002 | Misue et al. | 348/211.99 |
| 6,452,593 B1 * | 9/2002 | Challener | 345/419 |
| 6,466,250 B1 * | 10/2002 | Hein et al. | 348/14.16 |
| 6,496,201 B1 | 12/2002 | Baldwin et al. | |
| 6,583,806 B2 | 6/2003 | Ludwig et al. | |
| 6,594,688 B2 | 7/2003 | Ludwig et al. | |
| 6,807,566 B1 | 10/2004 | Bates et al. | |
| 6,909,443 B1 * | 6/2005 | Robertson et al. | 715/782 |

(Continued)

OTHER PUBLICATIONS

Tanenbaum, Andrew, "Structured Computer Organization," 1984, pp. 10-12.*

(Continued)

*Primary Examiner*—William L Bashore
*Assistant Examiner*—Jordany Núñez
(74) *Attorney, Agent, or Firm*—Fenwick & West LLP

(57) ABSTRACT

A videoconferencing application includes a user interface that provides multiple participant panels, each of which is displayed with perspective with the panels appearing to be angled with respect to the user interface window. The participant panels display live video streams from remote participants. A two-way layout provides two participant panels for two remote participants, each of which is angled inwardly towards a center position. A three-way layout provides three participant panels for three remote participants, with a left, center and right panel, with the left and right panels angled inwardly towards a center position.

25 Claims, 9 Drawing Sheets

U.S. PATENT DOCUMENTS

| | | | |
|---|---|---|---|
| 7,133,052 B1 * | 11/2006 | Silva ............................ | 345/646 |
| 7,152,093 B2 | 12/2006 | Ludwig et al. | |
| 7,206,809 B2 | 4/2007 | Ludwig et al. | |
| 7,421,470 B2 | 9/2008 | Ludwig et al. | |
| 7,433,921 B2 | 10/2008 | Ludwig et al. | |
| 7,546,538 B2 * | 6/2009 | Shuping et al. ............. | 715/760 |
| 7,605,837 B2 * | 10/2009 | Yuen et al. ................ | 348/14.16 |
| 7,679,639 B2 * | 3/2010 | Harrell et al. ............ | 348/14.08 |
| 2002/0158873 A1 * | 10/2002 | Williamson ................. | 345/427 |

OTHER PUBLICATIONS

Sun Lifeng et al., Building semi-immersing human-computer interaction environment of virtual teleconferencing based on multi-screen general projection, 2002, Communications, Circuits and Systems and West Sino Expositions, IEEE 2002 International Conference on (0-7803-7547-5), vol. 1, pp. 639-643.*

Gemmell, J. et al., "Gaze Awareness for Video-Conferencing: A Software Approach," IEEE, 2000, pp. 26-35.

Isaacs, E.A. et al., "Piazza: A Desktop Environment Supporting Impromptu and Planned Interactions," Computer Supported Cooperative Work, Nov. 1996, pp. 315-324.

Tang, J.C. et al., "Montage: Providing Teleproximity for Distributed Groups," Human Factors in Computing Systems, ACM, Apr. 24-28, 1994, pp. 37-43.

Tang, J.C. et al., "Supporting Distributed Groups with a Montage of Lightweight Interactions," ACM, 1994, pp. 23-34

Taylor, M.J. et al., "Gaze Communication Using Semantically Consistent Spaces," CHI '2000, ACM, 2000, pp. 400-407.

Vertegaal, R., "The GAZE Groupware System: Mediating Joint Attention in Multiparty Communication and Collaboration," Proceedings of ACM CHI'99 Conference on Human Factors in Computing Systems, ACM, May 15-20, 1999, pp. 294-301.

Vertegaal, R. et al., "GAZE-2: Conveying Eye Contact in Group Video Conferencing Using Eye-Controlled Camera Direction," CHI 2003, ACM, pp. 521-528, vol. 5, No. 1.

Zitnick, C.L. et al., "Manipulation of Video Eye Gaze and Head Orientation for Video Teleconferencing," Jun. 16, 1999, pp. 1-13.

Casner, Stephen et al., "N-Way Conferencing With Packet Video," ISI Reprint Series, ISI/RS-90-252, Apr. 1990, Reprinted from the Proceedings of The Third International Workshop on Packet Video, Mar. 22-23, 1990, Morristown, New Jersey, pp. 1-6.

Schooler, Eve M. et al., "A Packet-Switched Multimedia Conferencing System," Reprinted from the ACM SIGOIS Bulletin, vol. 1, No. 1, Jan. 1989, pp. 12-22 (numbered 1-11).

* cited by examiner

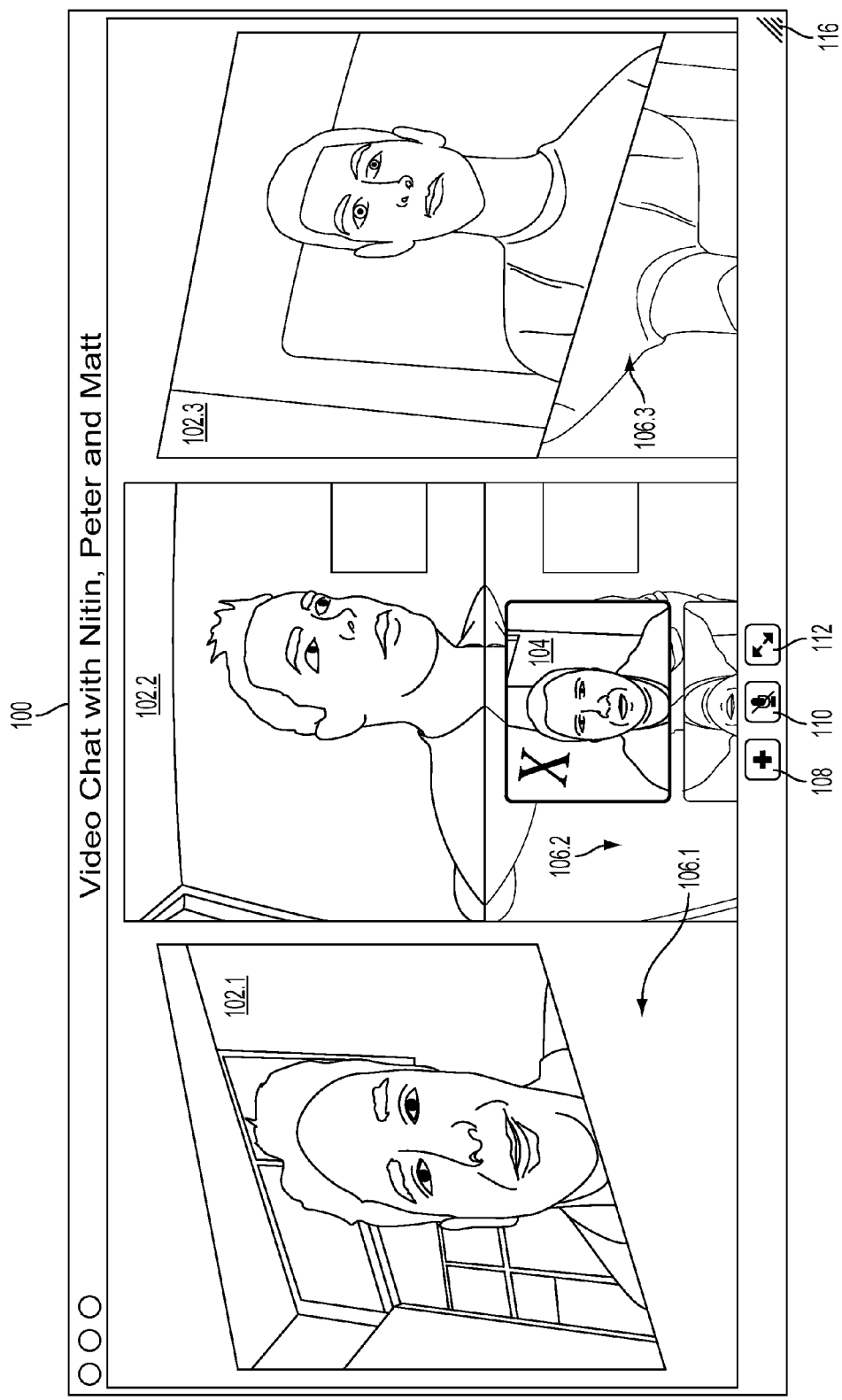

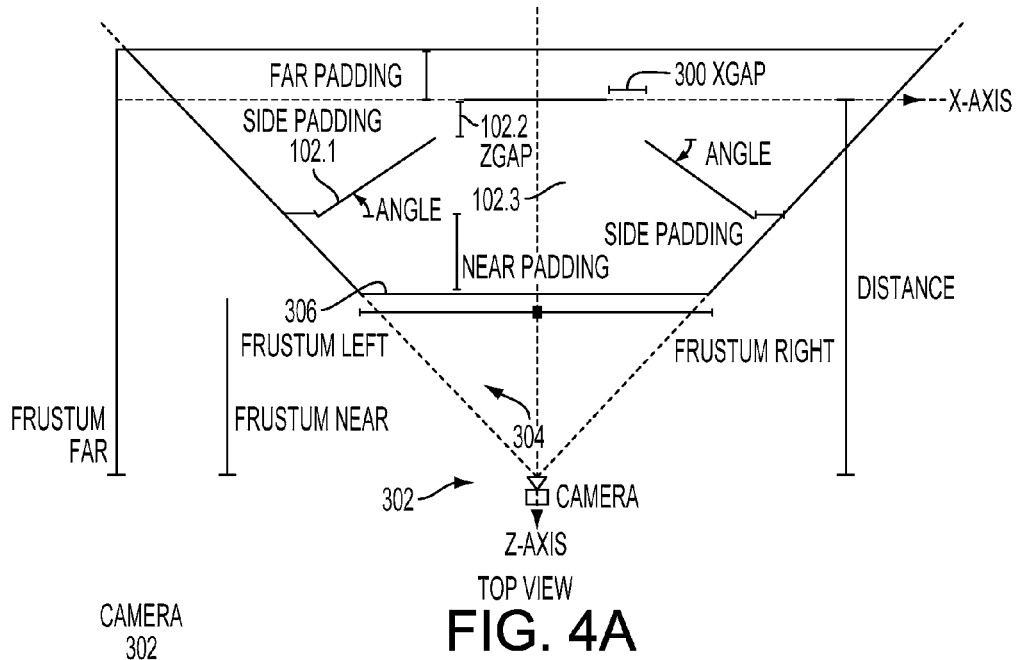
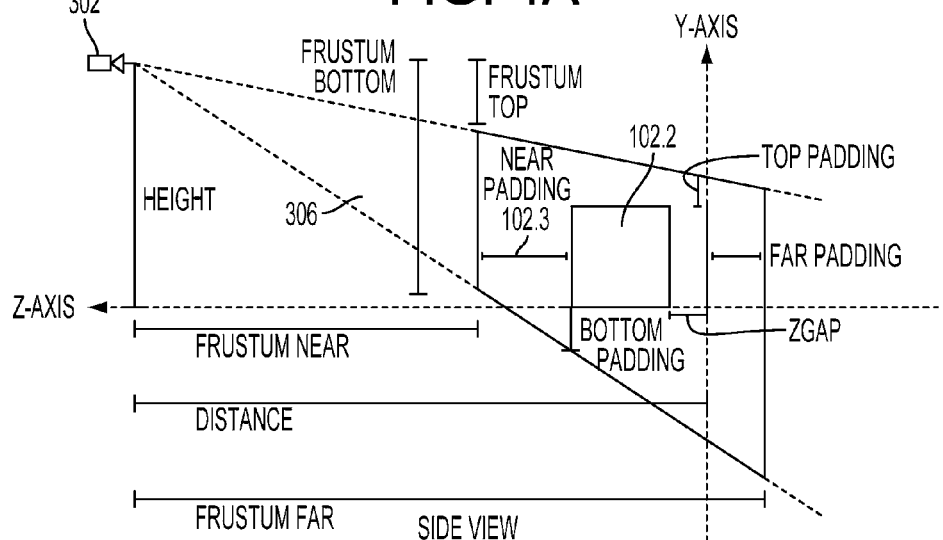
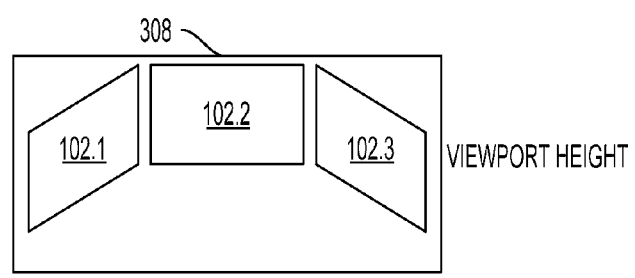
FIG. 4A
FIG. 4B
FIG. 4C

TOP VIEW

SIDE VIEW

CAMERA VIEW

MULTI-WAY VIDEO CONFERENCING USER INTERFACE

CROSS REFERENCE TO RELATED APPLICATION

The application is related to U.S. application Ser. No. 10/877,507, entitled "Mixed Media Conferencing," filed on Jun. 25, 2004, which is incorporated by reference herein.

FIELD OF THE INVENTION

The present invention relates to user interfaces for videoconferencing, and more particularly, to user interfaces which provide a simulated three-dimensional viewing area.

BACKGROUND OF THE INVENTION

Videoconferencing is now a widely used business communication tool, and the technology for the encoding and transmission of audio and video over telephone and computer networks is well advanced. Less well developed are the various types of user interfaces that can employed to present the images of the various participants in a videoconference. In particular, the user interfaces of existing so-called "desktop" videoconferencing applications do not provide a user with a realistic sense of physical place during a videoconference.

Conventional desktop videoconferencing applications provide a relatively static user interface in which individual windows are displayed for each other participant's real time video stream. FIG. 1 illustrates a typical prior art user interface for a multiway videoconferencing application. As can be readily seen, each participant's video stream is displayed in an individual window 101. The windows 101 themselves are displayed as entirely "flat" without any perspective projection relative to the user (e.g. an orthographic presentation of the window). Its important to note that whatever perspective is in the video (as a result of the remote participant's camera) does not itself provide or create a perspective effect of the window 101 in the user interface. At best, each window 101 can be positioned in on the screen at some (x,y) location, and can be resized for its width and height. The windows are displayed without any rotation or "tilt" the windows with respect to a Z-axis (normal to the screen) so as to impart a sense of perspective to the windows. As a result, users of these conventional videoconferencing applications do not achieve a sense of being in a conversation with other participants, since the physical cues of perspective that exist in a real face-to-face conversation are not present.

Accordingly, it is desirable to provide a videoconferencing application and user interface thereof that provides user with the physical cues of perspective.

SUMMARY OF THE INVENTION

The present invention provides a user interface for videoconferencing applications and systems. In one embodiment, the videoconferencing application includes a user interface window including two or more panels in which the live video streams of remote participants are displayed, and the panels are rendered with perspective. The perspective provided by angling the panels with respect to the plane of the user interface window. This has the effect of angling the panels with respect to the user's direct line of sight.

In one configuration in a videoconference with two remote participants, a two-way layout of the panels is used in which the two panels are rendered as slightly angled inwards towards the user. In a configuration in a videoconference with three remote participants, a three-way layout is used in which three panels are displayed, including a left panel, a center panel, and a right panel. The left and right panels are angled inwardly toward the user; the center panel directly faces the user, and is set back from the side panels. This layout creates a "theater in the round" effect. In both of the above configurations, the physical cues of the remote participants being across from the user in a face to face conversation are simulated. In either of the configurations, an effect of the angling at least the left and right panels is that these panels are no longer coplanar with the user interface window, suggesting that a front edge of the panel is closer to the user than a rear edge.

The user interface of the present invention supports further features that enhance the videoconference experience. A feature in one embodiment is the use of reflections of the live video streams in front of their respective panels, and towards the user. This gives the user the impression of the remote participants disposed across the user from a reflective surface, such as a floor or table. The reflections can be used with both a perspective projection of the panels and with an orthogonal projection.

Another feature is animated transitions between the two-way and three-way layout and vice versa. Another useful feature in an embodiment is the use of a spotlight effect on the panels prior to the video stream for a remote participant being rendered in the panel.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 3 is an illustration of a user interface of a videoconferencing application providing a three-way layout FIGS. 4A, 4B, and 4C together show the model and projection, and camera views of the three-way layout.

The figures depict one embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

The videoconferencing application and user interface of the present invention is adapted to operate in any type of server-client, peer-to-peer, or host-among-peer configuration. A suitable peer-to-peer audio conferencing system, is provided by Apple Computer, Inc., by its iChat AV software, and in U.S. Pat. Nos. 5,444,709, 5,434,860, 5,572,582, 5,664, 164, 5,854,898, 5,857,189, 5,864,678, 5,931,961, 6,189,034, 6,295,549, 5,920,732, 5,983,261, 6,175,856, 6,151,619, 5,973,724, 5,999,977, and the above cross-referenced application, all of which are incorporated by reference herein. As will be appreciated by those of skill in the art, the underlying videoconferencing implementation is not material to the present invention, which can cooperate with any available or later developed networking, video and audio codecs, or transmission systems.

For purposes of explanation only, as used here the term "user" will typically refer to the person who is using and viewing the user interface of the videoconferencing application, whereas the term "remote participant" will refer to the persons who are remotely located from the user (e.g., in another office, building, country). Of course the user himself is participant in the videoconference, and thus may also be referred to herein as a "first participant" while each remote participants may be referred to as a "second participant." Finally, the present invention is best suited for videoconferences in which there are at least two remote participants.

Figure 2:
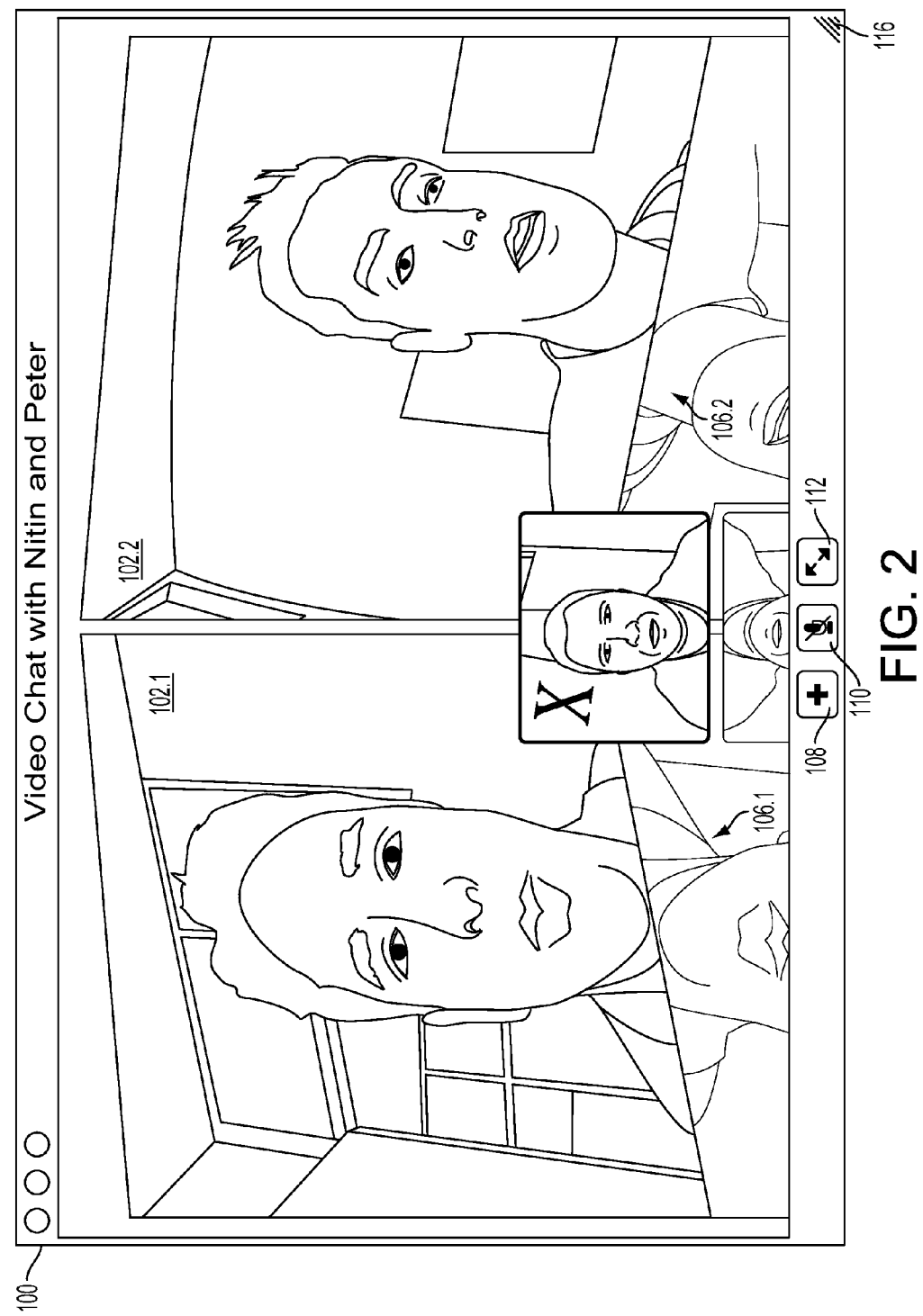
FIG. 2 is an illustration of a user interface of a videoconferencing application providing a two-way layout.

Referring now to FIG. 2, there is shown a user interface window 100 of a videoconferencing application providing a two-way layout for a videoconference involving a user and two remote participants. The interface 100 here includes two video panels 102, a left panel 102.1 and a right panel 102.2. Each panel 102 displays a live video stream from a videoconferencing application of a remote participant. In the bottom center of the interface 100 is a third panel 104 (user panel) that shows a live video stream of the user; this panel 104 is optional and may be turned off at the user's discretion. In another embodiment, panel 104 can be positioned next to or between the participant panels 102. Each of the video panels 102 is projected to provide the perspective effect of the panel 104 being angled with respect to a z-axis normal the screen plane, as illustrated. The left panel 102.1 is thus angled inward toward the right, while the right panel 102.2 is angled inward toward the left. The angled appearance of the panels 102 is achieved through a transformation of the rectangular video image stream for each panel 102, so that the panels are oriented towards a camera positioned at the horizontal center of the user interface window 100, and at a height above the top of the user interface window 100.

Figure 1:
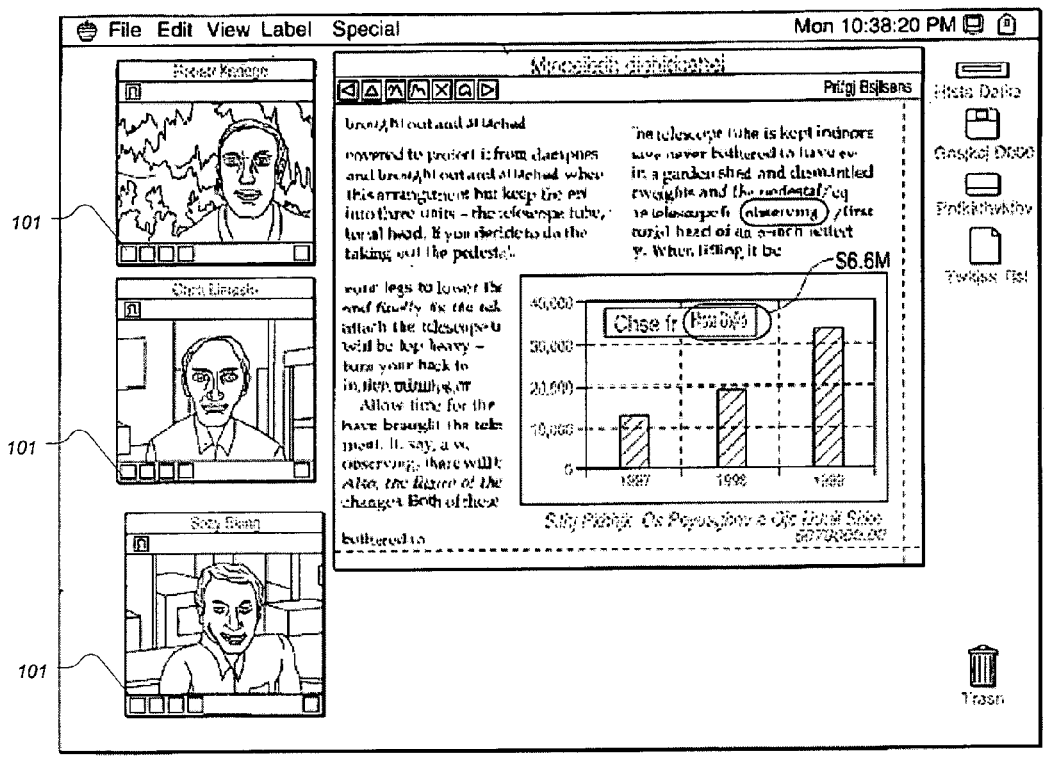
FIG. 1 is an illustration of a user interface of a prior art video conferencing application.

In the lower right hand corner of the interface 100 is a control region 116 that allows the user to resize the overall width and height of the interface window 100. In response, the videoconferencing application dynamically adjusts the size and positioning of the panels 102 (and panel 104 if present) to maintain the proper perspective appearance, aspect ratio and size of the panels 102 with respect to the resized window. Note that all of the panels 102 (and panel 104 if present) are preferably within a single window 100, and so that the user can move the entire user interface 100 at one time, preserving the relative positions of the panels 102, 104. This avoids imposing on the user the need to individually move and manipulate each panel 102 as would be required if each panel were in a separate window, as illustrated in FIG. 1. However, while less desirable, it is possible to render each of the panels in separate windows as well.

The perspective rendering of the panels 102 simulates the physical cues of position and orientation that a user would have with the other participants if they were physically present in the same space in a face-to-face conversation. These cues create a natural presentation of for the videoconference and thereby facilitate the overall interaction between all of the participants.

Figure 8A:
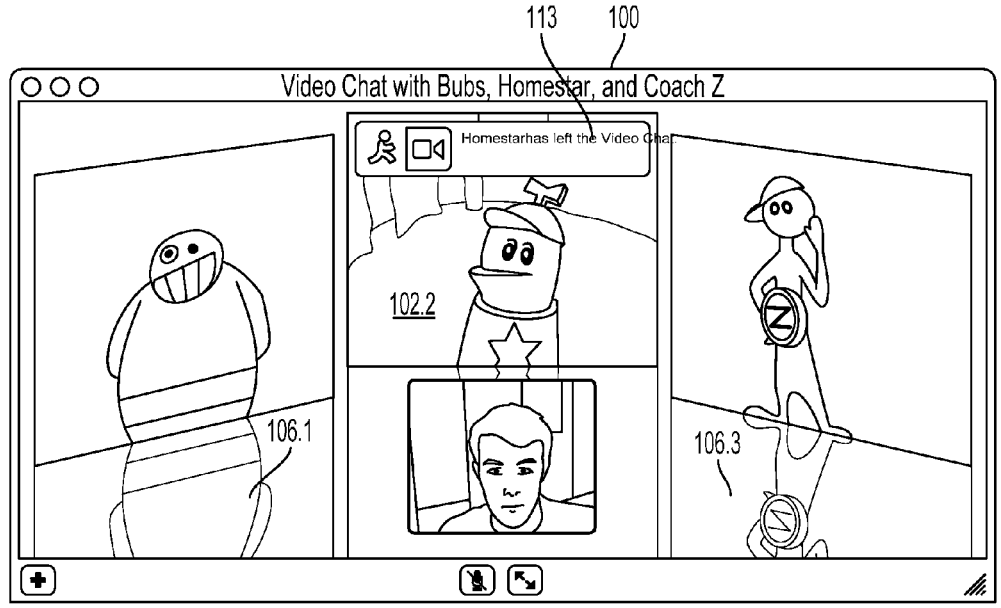
FIG. 8 illustrates the user interface 100 with the correct and incorrect rendering of text banners.
Figure 8B:
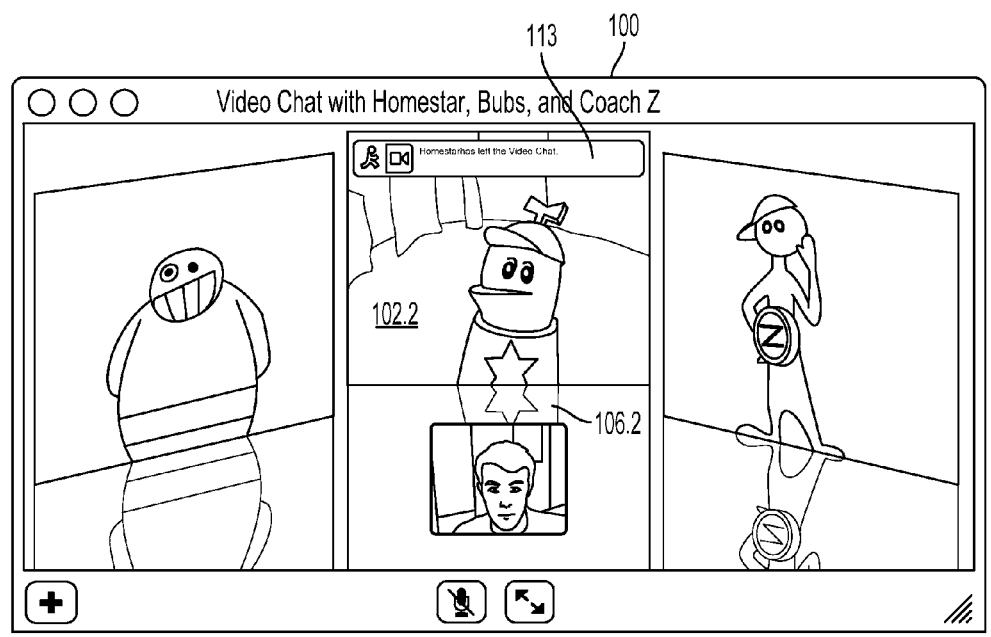

A further optional refinement of the user interface 100 is the use of foreground reflections 106 for each panel 102. Below—thus visually 'in front of'—each panel 102, there is a reflection 106 of the image stream in the panel 102. Thus, reflection 106.1 is a foreground reflection of the contents of panel 102.1, and reflection 106.2 is a foreground reflection of the contents of panel 102.2, each reflection being rendered in real time with the contents of the respective panel 102. FIGS. 8(a) and 8(b) also illustrate the use of reflections 106. The reflections 106 further enhance the sense of the physical presence between the user and the remote participants, as they provide a sense of the remote participants being positioned (e.g., seated) across a reflective surface (e.g., a table) from the user.

At the bottom of the user interface window 100 are three functional buttons. The add participant button 108 operates to add another participant to the current videoconference. The mute button 110 operates to mute the user's microphone input. The full screen button 112 expands the user interface 100 to fill the available screen size. At the top of the user interface window 100, are listed the names of the remote participants.

Referring now to FIG. 3, there is shown a user interface window 100 of a videoconferencing application providing a three-way layout for a videoconference involving a user and three remote participants. Here, three panels 102 are shown, with the left and right panels 102.1, 102.3 angled towards a camera position at the horizontal center of the user interface window 100, and slightly above the top of the user interface window 100. Between left and right participant panels is center panel 102.2. As before the user may optionally display user panel 104 with the user's own video stream displayed therein. Also, reflections 106 are optionally displayed as well. This embodiment of the user interface also simulates the natural perspective cues that a user; would have when in a face-to-face conversation with three other persons seated or standing in front of and around the user. In the foreground of each participant panel 102 is a corresponding reflection 106.

Referring to FIGS. 4A, 4B and 4C, there is shown the model and projection views (4A and 4B) and camera view (4C) of the three-way layout for explanation of how the three-way layout is generated using three-dimensional graphics. In one embodiment, the three dimensional graphic operations are implemented using the OpenGL graphics specification and a compatible graphics engine; other graphics engines and their corresponding operations may be readily used as well.

FIGS. 4A and 4B illustrate the top and side views of the model view and projection frustum for the three-way layout. By way of general description, there is defined a three dimensional space called a model view 300 (defined by x, y, and z axes), in which the panels 102 are positioned and then viewed from a camera 302. The model view 300 is indicated by the trapezoidal, solid line boundary in FIGS. 4A and 4B. The view of the panels 102 from the camera 302 is the view that is provided in the user interface window 100. This view is typically referred to as the view frustum or projection view 304, and is indicated by the dotted line boundary in the figures, which here extends along the boundaries of the model view 300 as well. The projection view 304 views the model view through the front face 306 of the view frustum.

FIG. 4C illustrates the basic structure of the camera view, which is defined by the viewport 308. The viewport 308 is the view that will be displayed in the user interface window 100. As noted above, the user interface window 100 is resizable by the user during a videoconference. Accordingly, in response to the user resizing the window, it is necessary to adjust the relative sizes and positions of the panels 102 for proper display.

Another aspect of the implementation is that the size (in model view units) of the center panel 102.2 in the model view 300 is selected to be exactly the same as its projected size (in pixels) in the view port 308, regardless of the size of viewport 308. This constraint results in certain computational efficiencies, as it allows all of the necessary projection variables to be determined as a function of just the size of the viewport 308, or a derivative thereof, particularly the size of a panel 102, as next described.

In particular, in OpenGL (and other graphics systems), it is necessary to define the boundaries of the view frustum 308, in order to determine the placement of the camera 302. The boundaries of frustum are the defined by the variables FrustumTop, FrustumBottom, FrustumRight, FrustumLeft, FrustumNear, and FrustumFar. In the present invention, these variables are computed from certain selected parameters, and from the viewport 308 size.

FrustumTop and FrustumBottom define the top and bottom offsets of the top and bottom boundaries of the front face of the frustum relative to the camera 302. Both of these values are negative, with FrustumBottom<FrustumTop, so that the camera's view axis is above the top of the panels 102, as illustrated in FIG. 4B. The result is that the horizon is not in the center of the viewport, but rather some distance above the top of the frustum, while maintaining the camera axis normal to the frustum face and parallel to the z-axis. Note that in the camera view (as in the examples in FIGS. 2 and 3, an in viewport 308 of FIG. 4C), that the left and right sides of each panel 102 are vertical, and parallel. In addition, the camera 302 is positioned so that the center panel 102.2 is a right rectangle.

FrustumRight and FrustumLeft define the offsets (from the z-axis) of the right and left boundaries. In this implementation, FrustumRight and FrustumLeft will be equal and opposite, thereby positioning the camera 302 in the middle of the frustum.

FrustumNear is the distance of the camera 302 to the front face of the frustum. FrustumFar is the distance of the camera 302 from the rear boundary of the projection view.

Prior to computation of the frustum boundaries, the location and orientation of the panels 102 in the model view 300 must be known. The unscaled parameters are as illustrated in FIGS. 4A and 4B, and described in Table 1:

TABLE 1

Model View Parameters for Three-way Layout

| Parameter | Meaning | Unscaled Value |
|---|---|---|
| XGap | X-axis distance between side edges of panels | 0.02 |
| ZGap | Z-axis distance between center panel and side panel | 0.34 |
| NearPadding | Z-axis distance between front edges of side panels and frustum face | 0.60 |
| FarPadding | Z-axis distance between center panel and rear frustum boundary | 0.15 |
| TopPadding | Y-axis distance between top of center panel and top frustum boundary | 0.04 |
| BottomPadding | Y-axis distance between front, bottom edge of side panel and bottom frustum boundary | 0.25 |
| SidePadding | X-axis distance between front edges of side panels and side frustum boundary | 0.04 |
| Height | Height of camera (in Y-axis) from Z-axis | 1.96 |
| Distance | Z-axis distance of camera from center panel | 6.53 |
| Angle | Angle of side panels with respect to X-axis | 38° |
| PanelAspectRatio | Width to height ratio of panels | 11/9 |

Values other than Angle and PanelAspectRatio are in the units of the model view 300. The selection of the above unscaled values yields an aesthetically pleasing arrangement and presentation of the panels 102, but other values may also be used as desired by the system designer. In an alternative embodiment, the user directly has control over some or all of these parameters through a graphical user interface, and may alter them as desired, for example to change the appearance of the panels 102.

The model parameters above are scaled by the viewport size to determine the frustum boundaries as follows, and hence to determine the projection of the panels 102. The variable PanelWidth characterizes the x-axis width of each panel 102. For purposes of computational efficiency and the ability to easily resize the user interface window 100, all of the frustum boundaries that are needed to render the projection view 304 are defined in terms of PanelWidth. PanelWidth in turn is a function of the viewport size, in particular ViewPortWidth. Note that either the height of a panel or its diagonal size could have been used as well in the following equations, with the appropriate geometric adjustments.

$$PanelWidth = \frac{ViewPortWidth * (Distance - ZGap - \sin(Angle))}{2 * Distance * (0.5 + XGap + \cos(Angle) + SidePadding)}$$

$$PanelHeight = PanelWidth / PanelAspectRatio$$

$$FrustumFar = PanelWidth * (Distance * FarPadding)$$

$$FrustumNear = PanelWidth * (Distance - ZGap - \sin(Angle) - NearPadding)$$

$$FrustumRight = \frac{(0.5 + XGap + \cos(Angle) + SidePadding) * FrustumNear}{Distance - ZGap - \sin(Angle)}$$

$$FrustumLeft = -FrustumRight$$

$$FrustumTop = \frac{(PanelHeight + PanelWidth * (TopPadding - Height)) * FrustumNear}{PanelWidth * Distance}$$

$$FrustumBottom = \frac{-(Height + BottomPadding) * FrustumNear}{Distance - ZGap - \sin(Angle)}$$

From the above equations, it can be readily seen that all of the frustum boundaries computed from the set forth parameters, and PanelWidth, which is used as a scaling factor. PanelWidth in turn is a function only of the default parameters and ViewPortWidth. ViewPortWidth is obtained from the current size (height and width) of the user interface window. Alternatively, the above equations could equivalently be computed from just the model parameters and ViewPortWidth.

With the foregoing description of the derivation of the frustum boundaries, the following process is followed to obtain the rendering of the panels.

1) Get the size of the view port, which includes ViewPortWidth.
2) Compute the PanelWidth and PanelHeight variables.
3) Compute the frustum boundaries.
4) Call OpenGL functions to set up frustum view:
   glMatrixMode(GL_PROJECTION);
   glLoadIdentity( )
   glFrustum(FrustumLeft, FrustumRight, FrustumBottom, FrustumTop, FrustumNear, FrustumRight);
5) Set up camera position, by call to glTranslate(0.0,−PanelWidth*Height,−PanelWidth*Distance). This call moves the camera 302 into the appropriate position relative to the projection view;
6) Initiate rendering of panels 102 with call to glMatrixMode (GL_MODELVIEW). Each panel 102 is then translated and rotated into position and then rendered.

The position of the panels 102 is determined from the various model parameters, and then applied to translate the origin of each panel to appropriate position in the model view.

When the user panel 104 is utilized, it is projected with a 2D orthographic projection and composited into place.

Figure 5A:
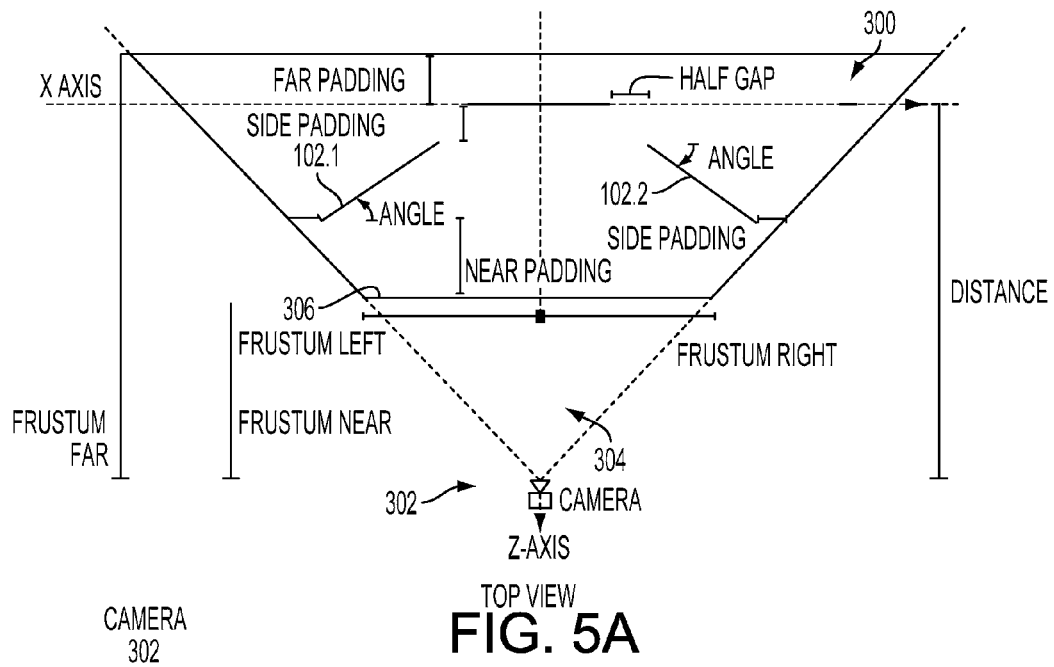
FIGS. 5A, 5B, and 5C together show the model and projection, and camera views of the three-way layout.
Figure 5B:
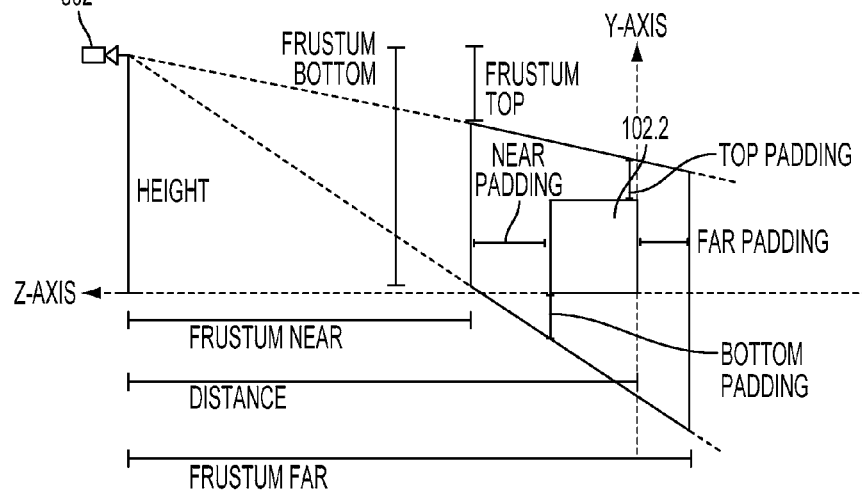
Figure 5C:
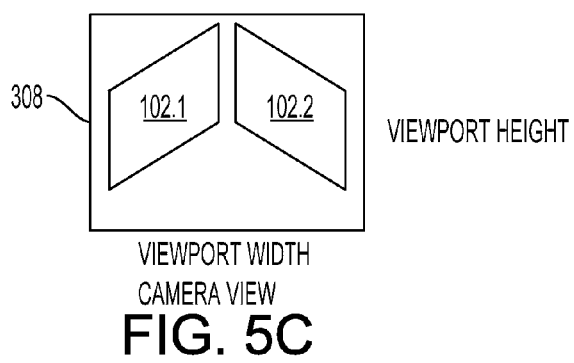

Referring now to FIGS. 5A, 5B, and 5C, there is shown the model and projection views (5A and 5B) and camera view (5C) of the two-way layout as illustrated in FIG. 2. The various model parameters described above are used (with adjusted values) to locate the panels 102 in the model view, except that instead of XGap, HalfGap is used to define the x-axis distance between the inner vertical edges of the two panels, and ZGap is not used.

TABLE 2

Model View Parameters for Two-way Layout

| Parameter | Initial Value |
|---|---|
| HalfGap | 0.02 |
| NearPadding | 0.60 |
| FarPadding | 0.15 |
| TopPadding | 0.05 |
| BottomPadding | 0.25 |
| SidePadding | 0.04 |
| Height | 1.60 |
| Distance | 4.00 |
| Angle | 25 |
| PanelAspectRatio | 11/9 |

Again, these values are chosen for their aesthetic effect, and other values may be used as desired by the system designer.

Next, the frustum boundary variables as are above, with the following adjustments:

PanelWidth=ViewPortWidth*K, where K is between 0.3 and 0.8.

Preferably K=0.5, so that the scaling of PanelWidth is to half of ViewPortWidth.

FrustumNear=PanelWidth*(Distance−sin(Angle)−NearPadding)

$$FrustumBottom = \frac{-(Height + BottomPadding) * FrustumNear}{Distance - \sin(Angle)}$$

These equations are changed to reflect that ZGap is not used.

$FrustumRight =$ $$\frac{(HalfGap + XGap + \cos(Angle) + SidePadding) * FrustumNear}{Distance - \sin(Angle)}$$

Once the frustum boundaries are computed, the graphics engine is invoked to determine the view frustum and then render the view for the viewport, as described above.

The foregoing formulation of the frustum boundaries achieves two beneficial goals. First, the selection of model parameters ensures that the resulting projection of the panels fills the available space of user interface window 100, in either the two-way or three-way layout, by fitting the frustum around the panels in the model view. That is, given the size of the window for the videoconferencing application, the useable space is maximized to make the panels 102 as a large as possible. This improves the user's perception of the quality of videoconferencing experience.

Second, the formulation of the frustum boundaries also ensures that the size of the panels 102 in the model view matches their same size when projected in the view port 308. This is achieved, for example, through the equation for PanelWidth. This is beneficial where the panels 102 support text banners and other user interface elements, since it allows these elements should remain constant in size, regardless of the size of the panel 102. FIG. 8 illustrates the benefits of this capability. In FIG. 8(*a*), there is shown the user interface window 100 in which the center panel 102.2 has a text banner 113 superimposed, and the user interface window 100 has been resized to about 50% of its original size. In this case, the center panel 102.2 was rendered (as where the other panels) using the above described methods, which results in text banner 113 being retained in size and thereby readable. By contrast, FIG. 8(*b*) shows the center panel 102.2 and its text banner 113 where the rendering has been done without the approach described above, and instead the center panel remains constant in size in the model view; thus when the view port gets smaller as the result of the resizing of the user interface window, the entire scene gets smaller as well. As a result, the text banner 113 is unreadable.

Figure 6:
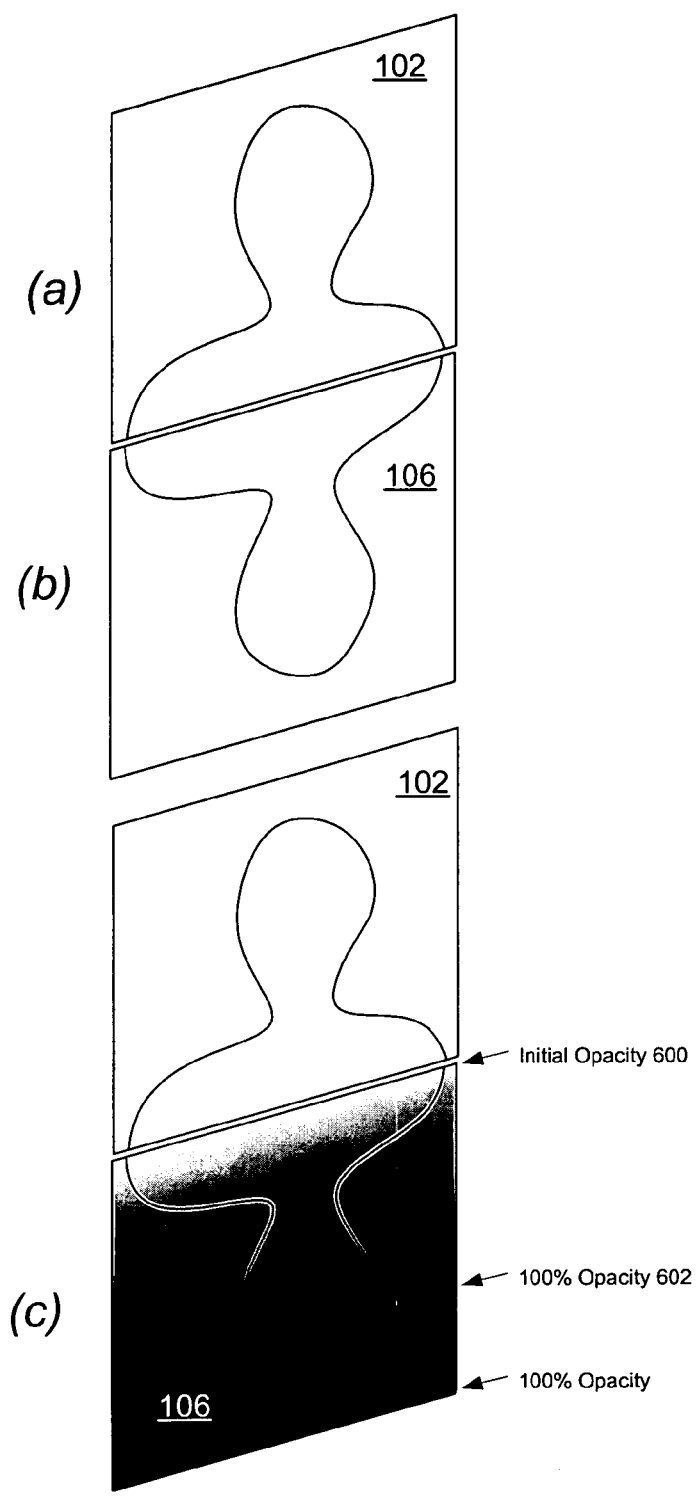
FIG. 6 illustrates the rendering of reflections.

As illustrated above in FIGS. 2, 3 and 8, another optional feature of the user interface of the present invention is the rendering of reflections 106 in front of the panels 102. FIG. 6 illustrates the steps of the reflection rendering process. As in FIG. 6(*a*), the image of the panel 102 is rendered as described above, in either the three-way or two-way layout mode. As in FIG. 6(*b*), the reflection 106 is then rendered as the image, flipped 180° around the bottom edge of the panel 102. As in FIG. 6(*c*), an opacity gradient is overlaid on the reflection, from an initial opacity level 602 (e.g., 50%) to a final opacity level 602 (e.g. 100%) that can occur midway in the reflection as illustrated, or the "top" edge (now on the bottom). In other embodiments, one or more of the participant panels 102 is rendered with a foreground reflection 106, but with an orthogonal projection instead of a perspective projection, such as the reflection 106.2 of the center participant panel 102.2 shown in FIG. 3.

Figure 7:
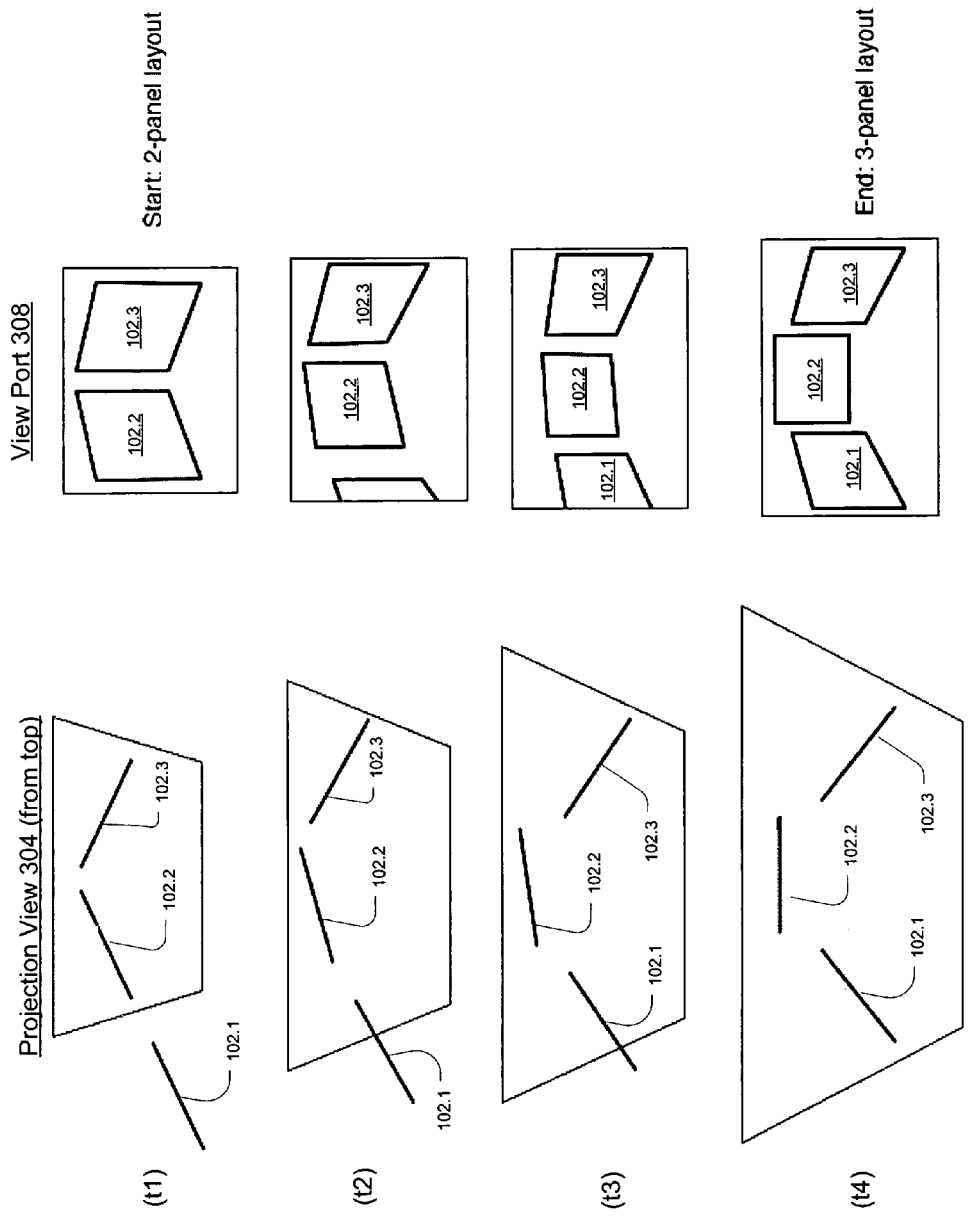
FIG. 7 illustrates the animated transition between layouts.

Another feature of the present invention is the use of animated transitions between the two-way and three-way layouts, and vice versa. FIG. 7 illustrates the animated transition process from the two-way layout to the three-way layout, showing four example key frames at times t1, t2, t3, and t4. Typically a videoconference will start in the two-way layout, as illustrated in FIG. 2. Either the user or one of the remote participants can add a new participant to the videoconference via the add participant button 108. While the invited participant makes the decision as to whether to join, the video conferencing application begins the animated transition. Referring to FIG. 7, at a time t1, a new panel 102.1 is placed outside the projection view 304. From time t1 to time t2, the new panel 102.1 is smoothly moved into the projection view 304 from the left, and the positions of the other panels 102.2 and 102.3 are adjusted to the right, as illustrated in the top view of the projection view, and in the viewport 308. The smooth movement of the new panel 102.1 into the projection view 304 continues through time t3, and ends at time t4 at which point all three panels 102 are positioned as defined by the three-way layout. The animation of frames in between the various times t1, t2, t3, t4, is done by interpolation, for example moving the panels 102 along spline curves between their initial and final positions. During a four person videoconference, using the three-way layout, a participant can drop off, in which case, each of the remaining participant's user interfaces animate a transition from the three-way layout to the two-way layout, essential reversing the animation sequence illustrated in FIG. 7.

The animated transition illustrated in FIG. 7 is but one of many different types of transitions that can be designed in view of the present invention. More generally, a third panel 102 can be animated as coming from behind, from the top, from the right, or from the bottom, and into either the left, center or right position. The existing panels are concurrently animated to open a gap in the appropriate place for the third panel 102 to move into. All of these various animated transitions are considered equivalent functionally, though they may have different aesthetic effects.

These animated transitions are automatically invoked, without the user having to do more than add a participant, or have participant drop off of the videoconference. The videoconference application which supports the user interface 100 automatically determines the number of participants and selects the appropriate layout for the user interface.

In another embodiment, the user interface 100 uses an orthogonal projection of all of the participant panels 102, and then provides animated transitions between the orthogonal projection and the perspective projections described above with respect to FIGS. 3 and 4. The user can initiate the transition upon selection of a desired mode of operation. For example, the videoconference application can default to an orthogonal projection of the panels 102 and the user can activate the perspective projection of the panels, whereby the transition from the orthogonal to perspective transition is then animated by appropriately translating and angling the panels 102 to result in the above described layouts, depending on the number of panels in use. Likewise, the user can activate the opposite transitions as well.

Yet another optional feature of the user interface 100 that contributes to the videoconference experience is the manner in which panels 102 are presented while waiting for a new participant to accept an invitation to join a videoconference. When one of the participants selects the add participant button 108, a message (an invitation) is sent to the selected participant, identifying the existing participants and giving the new participant the opportunity to join or decline the invitation. During this period (and preferably though not necessarily after the above described animated transition) the panel 102 for the new participant is shown without the image of the participant, but rather with a spotlight effect and its reflection.

Figure 9:
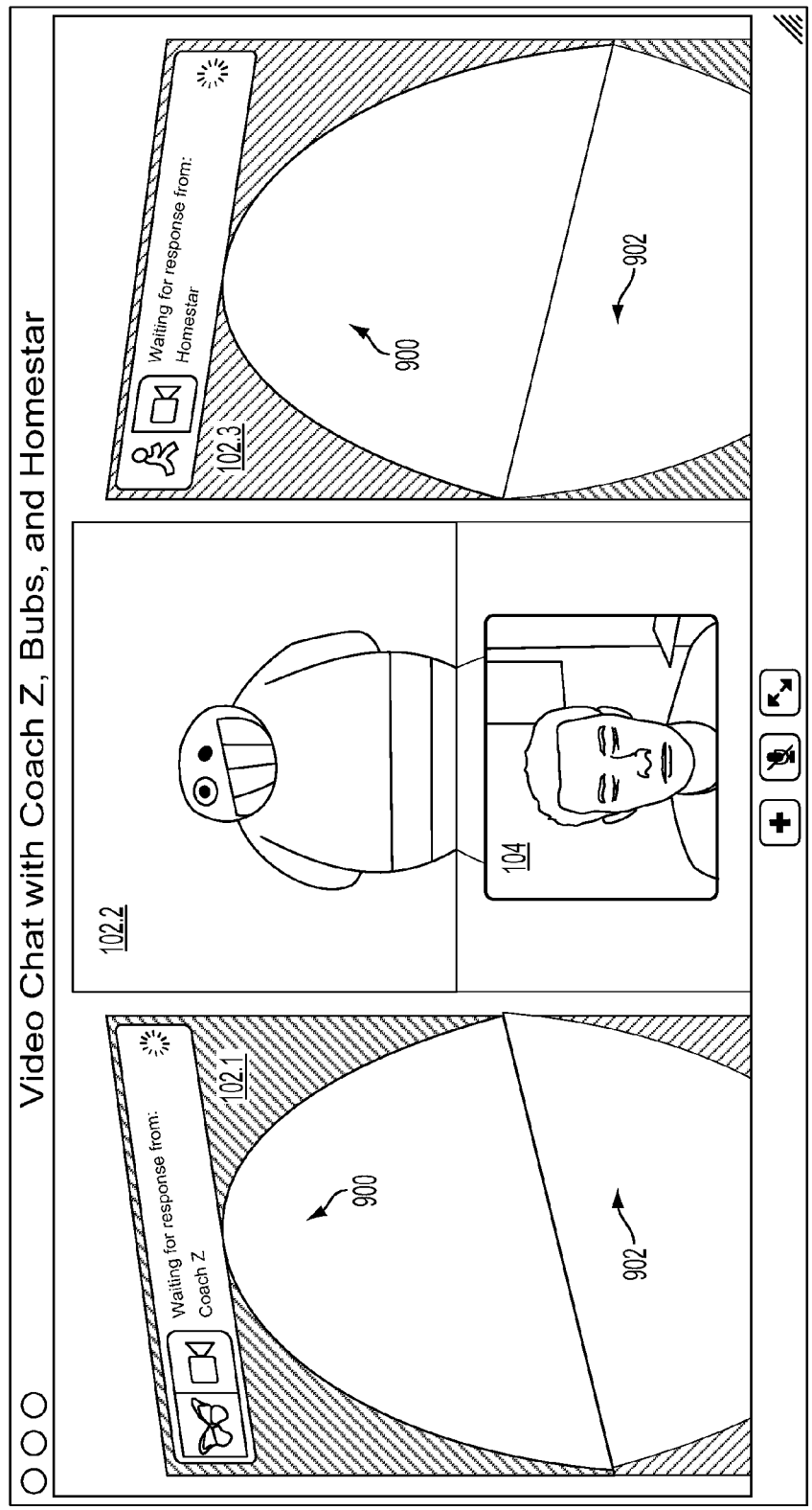
FIG. 9 illustrates the spotlight effect.

FIG. 9 illustrates this feature. As seen in FIG. 9, the current user, shown in panel 104, and one participant, shown in panel 102.2, has requested two other participants to join the videoconference. The panels 102.1 and 102.3 for these participants are placed in the three-way layout configuration, and on each panel 102 there is rendered a lighted area 900 of a spotlight and the reflection 902 of the spotlight. This draws the attention of the user to these panels as a way of introducing the participants as they are added to the videoconference. The spotlight effect and reflection can be implemented using a lighting source in the model view positioned over the panel, or by overlaying a gradient on the panel and where the reflection is desired.

The present invention has been described in particular detail with respect to various possible embodiments. Those of skill in the art will appreciate that the invention may be practiced in other embodiments. For example, the user interface is not limited to only three participant panels 102 as shown, but may include more panels as well in various arrangements, so long as at least some of the panels 102 are projected with perspective.

Those of skill in the art will also appreciate that the particular naming of the components, parameters, or variables, the capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program product stored on a computer readable medium that can be accessed by the computer. Such a computer program product may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A computer-implemented method for displaying participant panels in a user interface window of a videoconferencing application, the method comprising:
   receiving in a single computer at least two live video streams, each live video stream associated with a remote participant;
   generating in the computer a single user interface window;
   determining a three dimensional model view for displaying participant panels;
   generating in the three dimensional model view a participant panel for each of the live video streams, each participant panel associated with a remote participant, the participant panels including a first participant panel and a second participant panel;
   determining a viewport for rendering the three dimensional model view, including the first participant panel and the second participant panel, in the single user interface window;
   determining a projection of the participant panels in the viewport such that a projected size of each participant panel in the viewport is the same number of units as a size of the participant panel in the model view;
   displaying the first participant panel to the left of a horizontal center of the user interface window, the first participant panel displayed in a coplanar orientation with respect to the plane of the user interface window;
   displaying the second participant panel to the right of the horizontal center of the user interface window, the second participant panel displayed in the coplanar orientation with respect to the plane of the user interface window;
   receiving a trigger event to display the first participant panel and the second participant panel in a perspective orientation relative to the plane of the user interface window; and
   responsive to receiving the trigger event:
      displaying the first participant panel in a perspective orientation relative to the plane of the user interface window, wherein the first participant panel is angled towards the horizontal center of the user interface window; and
      displaying the second participant panel in the perspective orientation relative to the plane of the user interface window, wherein the second participant panel is angled towards the horizontal center of the user interface window.

2. The computer-implemented method of claim 1, further comprising:
   displaying a spotlight effect on one of the participant panels; and
   responsive to displaying the spotlight effect, displaying the live video stream associated with the participant panel; and
   displaying a foreground reflection of the spotlight effect in front of the participant panel.

3. The computer-implemented method of claim 1, further comprising:
   displaying in the user interface window a user panel containing a live video stream of the user of the videoconferencing application in a foreground between the first participant panel and the second participant panel.

4. The computer-implemented method of claim 1 wherein the third participant panel is displayed with perspective.

5. The computer-implemented method of claim 1, further comprising:
   animating a transition between the user interface window displaying the first participant panel and the second participant panel in the coplanar orientation and displaying the first participant panel and the second participant panel in the perspective orientation; and
   animating a transition between the user interface window displaying the first participant panel and the second participant panel in the perspective orientation and displaying the first participant panel and the second participant panel in the coplanar orientation.

6. The computer-implemented method of claim 5, further comprising:
   animating the transition in response to a user selection of a mode of operation of the videoconferencing application.

7. The computer-implemented method of claim 1, wherein displaying the first participant panel in the perspective orientation and displaying the second participant panel in the perspective orientation comprises:
   defining a plurality of model parameters that place the first participant panel and the second participant panel in the three dimensional model view having an X-axis, a Y-axis, and a Z-axis, the model parameters including an angle of the first participant panel and the second participant panel with respect to the X-axis;
   determining the viewport for rendering the three dimensional model view as a function of a size of the user interface window;
   determining a projection frustum of the three dimensional model view including the participant panels as a function essentially of a size of the viewport and the model parameters scaled by the size of the viewport;
   rendering the projection frustum in the viewport; and
   displaying the rendered frustum in the user interface window.

8. The computer-implemented method of claim 7, wherein there is a third participant panel and the projection frustum is defined by the variables FrustumTop, FrustumBottom, FrustumRight, FrustumLeft, FrustumNear, and FrustumFar, according to the following equations:

$$PanelWidth = \frac{ViewPortWidth * (Distance - ZGap - \sin(Angle))}{2 * Distance * (0.5 + XGap + \cos(Angle) + SidePadding)};$$

$$PanelHeight = PanelWidth / PanelAspectRatio;$$

$$FrustumFar = PanelWidth * (Distance * FarPadding);$$

$$FrustumNear =$$
$$PanelWidth * (Distance - ZGap - \sin(Angle) - NearPadding);$$

$$FrustumRight =$$
$$\frac{(0.5 + XGap + \cos(Angle) + SidePadding) * FrustumNear}{Distance - ZGap - \sin(Angle)};$$

-continued $$FrustumLeft = -FrustumRight,$$

$$FrustumTop = \frac{(PanelHeight + PanelWidth * \frac{(TopPadding - \text{Height})) * FrustumNear}{PanelWidth * \text{Distance}}}$$

where:
ViewPortWidth is a width of a viewport for displaying the participant panels;
PanelWidth is a width of each participant panel;
Xgap is an X-axis distance between side edges of the participant panels;
ZGap is a Z-axis distance between a center participant panel and a side participant panel;
NearPadding is the Z-axis distance between a front edge of a side participant panel and a face of the projection frustum;
FarPadding is the Z-axis distance between the center participant panel and a rear frustum boundary;
TopPadding is a Y-axis distance between a top of the center participant panel and a top frustum boundary;
BottomPadding is the Y-axis distance between the front edge and a bottom edge of the side participant panel and a bottom frustum boundary;
SidePadding is the X-axis distance between the front edges of the side participant panels and a side frustum boundary;
Height is the Y-axis distance of a virtual camera from the Z-axis;
Distance is the Z-axis distance of the virtual camera from the center participant panel;
Angle is an angle of the side participant panels with respect to the X-axis; and
PanelAspectRatio is a width to height ratio of the participant panels.

9. The computer-implemented method of claim 7, wherein the projection frustum is defined by the variables FrustumTop, FrustumBottom, FrustumRight, FrustumLeft, FrustumNear, and FrustumFar, according to the following equations:

$$PanelWidth = ViewPortWidth * K;$$

$$PanelHeight = PanelWidth / PanelAspectRatio,$$

$$FrustumFar = PanelWidth * (\text{Distance} * FarPadding);$$

$$FrustumNear = PanelWidth * (\text{Distance} - \sin(\text{Angle}) - NearPadding)$$

$$FrustumRight = \frac{(HalfGap + XGap + \cos(\text{Angle}) + SidePadding) * FrustumNear}{\text{Distance} - \sin(\text{Angle})}$$

$$FrustumLeft = -FrustumRight,$$

$$FrustumTop = \frac{(PanelHeight + PanelWidth * \frac{(TopPadding - \text{Height})) * FrustumNear}{PanelWidth * \text{Distance}}}$$

$$FrustumBottom = \frac{-(\text{Height} + BottomPadding) * FrustumNear}{\text{Distance} - ZGap - \sin(\text{Angle})}$$

where:
ViewPortWidth is a width of a viewport for displaying the participant panels;
PanelWidth is a width of each participant panel;
K is a scaling factor;
HalfGap is an X-axis distance between inner side edges of the participant panels;
NearPadding is a Z-axis distance between a front edge of a side participant panel and a face of the projection frustum;
FarPadding is the Z-axis distance between a center participant panel and a rear frustum boundary;
TopPadding is a Y-axis distance between a top of the center participant panel and a top frustum boundary
BottomPadding is the Y-axis distance between the front edge and a bottom edge of the side participant panel and a bottom frustum boundary;
SidePadding is the X-axis distance between the front edges of the side participant panels and a side frustum boundary;
Height is the Y-axis distance of a virtual camera from the Z-axis;
Distance is the Z-axis distance of the virtual camera from the center participant panel;
Angle is an angle of the side participant panels with respect to the X-axis; and
PanelAspectRatio is a width to height ratio of the participant panels.

10. The computer-implemented method of claim 7, wherein the projection frustum has a top boundary, and a virtual camera is placed such that a view axis of the virtual camera is above the top boundary, and parallel to the z-axis.

11. The computer-implemented method of claim 1, further comprising:
displaying a participant panel at first size, with a text banner, the text banner having a text height and a first width;
receiving a reduction in size of the user interface window;
displaying the participant panel at a reduced size in response to the reduction in size of the user interface window; and
displaying the text banner over the participant panel at the same text height and a reduced width.

12. The computer-implemented method of claim 1, wherein displaying the first participant panel in the perspective orientation and displaying the second participant panel in the perspective orientation comprises:
defining a plurality of model parameters that place the first participant panel and the second participant panel in a three dimensional model view having an X-axis, a Y-axis, and a Z-axis, the model parameters including an angle of the first participant panel and the second participant panel with respect to the X-axis;
determining the viewport for rendering the three dimensional model view as a function of a size of the user interface window;
determining a projection frustum of the three dimensional model view, wherein determining the projection frustum comprises:
determining for each participant panel, a panel height and a panel width, wherein the panel height and panel width are based at least on a width of the view port; and
determining a plurality of frustum boundaries for placement of a camera, wherein the plurality of frustum boundaries are based at least on a scaling factor, the scaling factor a function of the panel width;
rendering the projection frustum in the viewport; and
displaying the rendered frustum in the user interface window.

13. A computer program product, stored on a computer readable storage medium, and including computer executable instructions for controlling a computer system to execute a videoconferencing application for displaying participant panels in a user interface window of a videoconferencing application, by performing the operations of:
receiving in a single computer at least two live video streams, each live video stream associated with a remote participant;
generating in the computer a single user interface window;
determining a three dimensional model view for displaying participant panels;
generating in the three dimensional model view a participant panel for each of the live video streams, each participant panel associated with a remote participant, the participant panels including a first participant panel and a second participant panel;
determining a viewport for rendering the three dimensional model view, including the first participant panel and the second participant panel, in the single user interface window;
determining a projection of the participant panels in the viewport such that a projected size of each participant panel in the view port is the same number of units as a size of the participant panel in the model view;
displaying the first participant panel to the left of a horizontal center of the user interface window, the first participant panel displayed in a coplanar orientation with respect to the plane of the user interface window;
displaying the second participant panel to the right of the horizontal center of the user interface window, the second participant panel displayed in the coplanar orientation with respect to the plane of the user interface window;
receiving a trigger event to display the first participant panel and the second participant panel in a perspective orientation relative to the plane of the user interface window; and
responsive to receiving the trigger event:
displaying the first participant panel in a perspective orientation relative to the plane of the user interface window, wherein the first participant panel is angled towards the horizontal center of the user interface window; and
displaying the second participant panel in the perspective orientation relative to the plane of the user interface window, wherein the second participant panel is angled towards the horizontal center of the user interface window.

14. The computer program product of claim 13, wherein a foreground reflection is displayed in front of a participant panel.

15. The computer program product of claim 13, further comprising:
a user panel containing a live video stream of the user of the videoconferencing application in a foreground between the first participant panel and the second participant panel.

16. The computer program product of claim 13, wherein a third participant panel is displayed with perspective.

17. The computer program product of claim 13, further comprising:
a spotlight effect on a participant panel, prior to the participant panel receiving the live video stream; and
a foreground reflection of the spotlight effect in front of the participant panel.

18. The computer program product of claim 13, wherein the computer readable storage medium further includes computer executable instructions for:
animating a transition between the user interface window displaying the first participant panel and the second participant panel in the coplanar orientation and displaying the first participant panel and the second participant panel in the perspective orientation; and
animating a transition between the user interface window displaying the first participant panel and the second participant panel in the perspective orientation and displaying the first participant panel and the second participant panel in the coplanar orientation.

19. The computer program product of claim 13, wherein the computer readable storage medium further includes computer executable instructions for:
animating the transition in response to a user selection of a mode of operation of the videoconferencing application.

20. The computer program product of claim 13, wherein the computer readable storage medium further includes computer executable instructions for:
displaying a participant panel at first size, with a text banner, the text banner having a text height and a first width;
receiving a reduction in size of the user interface window;
displaying the participant panel at a reduced size in response to the reduction in size of the user interface window; and
displaying the text banner over the participant panel with the same text height and a reduced width.

21. The computer program product of claim 13, wherein displaying the first participant panel in the perspective orientation and displaying the second participant panel in the perspective orientation comprises:
defining a plurality of model parameters that place the first participant panel and the second participant panel in the three dimensional model view having an X-axis, a Y-axis, and a Z-axis, the model parameters including an angle of the first participant panel and the second participant panel with respect to the X-axis;
determining the viewport for rendering the three dimensional model view as a function of a size of the user interface window;
determining a projection frustum of the three dimensional model view including the participant panels as a function essentially of a size of the viewport and the model parameters scaled by the size of the viewport;
rendering the projection frustum in the viewport; and
displaying the rendered frustum in the user interface window.

22. The computer program product of claim 13, wherein displaying the first participant panel in the perspective orientation and displaying the second participant panel in the perspective orientation comprises:
defining a plurality of model parameters that place the first participant panel and the second participant panel in the three dimensional model view having an X-axis, a Y-axis, and a Z-axis, the model parameters including an angle of the first participant panel and the second participant panel with respect to the X-axis;
determining a viewport for rendering the model view as a function of a size of the user interface window;
determining a projection frustum of the three dimensional model view, wherein determining the projection frustum comprises:
determining for each participant panel, a panel height and a panel width, wherein the panel height and panel width are based at least on a width of the view port; and
determining a plurality of frustum boundaries for placement of a camera, wherein the plurality of frustum boundaries are based at least on a scaling factor, the scaling factor a function of the panel width;
rendering the projection frustum in the viewport; and displaying the rendered frustum in the user interface window.

23. A computer-implemented system for displaying participant panels in a user interface window of a videoconferencing application, the system comprising:
a computer processor; and
a computer-readable storage medium storing instructions when executed by the processor perform a method, the method comprising:
receiving in a single computer at least two live video streams, each live video stream associated with a remote participant;
generating in the computer a single user interface window;
determining a three dimensional model view for displaying participant panels;
generating in the three dimensional model view a participant panel for each of the live video streams, each participant panel associated with a remote participant, the participant panels including a first participant panel and a second participant panel;
determining a viewport for rendering the three dimensional model view, including the first participant panel and the second participant panel, in the single user interface window;
determining a projection of the participant panels in the viewport such that a projected size of each participant panel in the view port is the same number of units as a size of the participant panel in the model view;
displaying the first participant panel to the left of a horizontal center of the user interface window, the first participant panel displayed in a coplanar orientation with respect to the plane of the user interface window;
displaying the second participant panel to the right of the horizontal center of the user interface window, the second participant panel displayed in the coplanar orientation with respect to the plane of the user interface window;
receiving a trigger event to display the first participant panel and the second participant panel in a perspective orientation relative to the plane of the user interface window; and
responsive to receiving the trigger event:
displaying the first participant panel in a perspective orientation relative to the plane of the user interface window, wherein the first participant panel is angled towards the horizontal center of the user interface window; and
displaying the second participant panel in the perspective orientation relative to the plane of the user interface window, wherein the second participant panel is angled towards the horizontal center of the user interface window.

24. A computer implemented method for displaying participant panels in a user interface window of a videoconferencing application, the method comprising:
receiving in a single computer at least two live video streams, each live video stream associated with a remote participant;
generating in the computer a participant panel for each of the live video streams, each participant panel associated with a remote participant, the participant panels including a first participant panel and a second participant panel;
defining a plurality of model parameters that place each participant panel in a three-dimensional model view having a X-axis, a Y-axis, and a Z-axis, the model parameters including an angle of the participant panels with respect to the X-axis;

determining a viewport for rendering the model view as a function of a size of a single user interface window of the videoconferencing application;
determining a projection frustum of the model view, wherein the projection frustum is defined by the variables FrustumTop, FrustumBottom, FrustumRight, FrustumLeft, FrustumNear, and FrustumFar, according to the following equations:

$$PanelWidth = ViewPortWidth * K;$$

$$PanelHeight = PanelWidth / PanelAspectRatio;$$

$$FrustumFar = PanelWidth * (Distance - \sin(Angle) - NearPadding)$$

$$FrustumNear = PanelWidth * (Distance - \sin(Angle) - NearPadding)$$

$$FrustumRight = \frac{(HalfGap + XGap + \cos(Angle) + SidePadding) * FrustumNear}{Distance - \sin(Angle)}$$

$$FrustumLeft = -FrustumRight;$$

$$FrustumTop = \frac{(PanelHeight + PanelWidth * (TopPadding - Height)) * FrustumNear}{PanelWidth * Distance};$$

$$FrustumBottom = \frac{-(Height + BottomPadding) * FrustumNear}{Distance - \sin(Angle)}$$

where:
ViewPortWidth is a width of the viewport for displaying the participant panels;
PanelWidth is a width of each participant panel;
K is a scaling factor;
HalfGap is an X-axis distance between inner side edges of the participant panels;
NearPadding is a Z-axis distance between a front edge of a side participant panel and a face of the projection frustum;
FarPadding is the Z-axis distance between a center participant panel and a rear frustum boundary;
TopPadding is a Y-axis distance between a top of the center participant panel and a top frustum boundary
BottomPadding is the Y-axis distance between the front edge and a bottom edge of the side participant panel and a bottom frustum boundary;
SidePadding is the X-axis distance between the front edges of the side participant panels and a side frustum boundary;
Height is the Y-axis distance of a virtual camera from the Z-axis;
Distance is the Z-axis distance of the virtual camera from the center participants panel;
Angle is an angle the of side participant panels with respect to the X-axis; and
PanelAspectRatio is a width to height ratio of the participant panels;
rendering the projection frustum in the viewport;
displaying the rendered frustum in the single user interface window;
displaying the first participant panel in an orthographic presentation relative to the user interface window, where the angle of the first participant panel with respect to the X-axis is zero;
displaying the second participant panel in an orthographic presentation relative to the user interface window, where the angle of the second participant panel with respect to the X-axis is zero;

receiving a trigger event to display the first participant panel and the second participant panel with perspective relative to the user interface window; and responsive to receiving the trigger event:
- displaying the first participant panel with perspective relative to the user interface window and angled towards the horizontal center of the user interface window, by increasing the angle of the first participant panel with respect to the X-axis from zero to a final non-zero value; and
- displaying the second participant panel with perspective relative to the user interface window and angled towards the horizontal center of the user interface window, by increasing the angle of the second participant panel with respect to the X-axis from zero to a final non-zero value.

25. A computer implemented method for displaying participant panels in a user interface window of a videoconferencing application, the method comprising:

receiving in a single computer at least three live video streams, each live video stream associated with a remote participant;

generating in the computer a participant panel for each of the live video streams, each participant panel associated with a remote participant, the participant panels including a first participant panel, a second participant panel, and a third participant panel;

defining a plurality of model parameters that place each participant panel in a three-dimensional model view having an X-axis, a Y-axis, and a Z-axis, the model parameters including an angle of the participant panels with respect to the X-axis;

determining a viewport for rendering the model view as a function of a size of the single user interface window;

determining a projection frustum of the model view, wherein the projection frustum is defined by the variables FrustumTop, FrustumBottom, FrustumRight, FrustumLeft, FrustumNear, and FrustumFar, according to the following equations:

$$PanelWidth = \frac{ViewPortWidth * (Distance - ZGap - \sin(Angle))}{2 * Distance * (0.5 + XGap + \cos(Angle) + SidePadding)};$$

$$PanelHeight = PanelWidth / PanelAspectRatio;$$

$$FrustumFar = PanelWidth * (Distance * FarPadding);$$

$$FrustumNear = PanelWidth * (Distance - ZGap - \sin(Angle) - NearPadding);$$

$$FrustumRight = \frac{(0.5 + XGap + \cos(Angle) + SidePadding) * FrustumNear}{Distance - ZGap - \sin(Angle)};$$

$$FrustumLeft = -FrustumRight;$$

$$FrustumTop = \frac{(PanelHeight + PanelWidth * (TopPadding - Height)) * FrustumNear}{PanelWidth * Distance};$$

$$FrustumBottom = \frac{-(Height + BottomPadding) * FrustumNear}{Distance - ZGap - \sin(Angle)};$$

where:
- ViewPortWidth is a width of the viewport for displaying the participant panels;
- PanelWidth is a width of each participant panel;
- Xgap is a X-axis distance between side edges of the participant panels;
- ZGap is a Z-axis distance between a center participant panel and a side participant panel;
- NearPadding is the Z-axis distance between a front edge of a side participant panel and a face of the projection frustum;
- FarPadding is the Z-axis distance between the center participant panel and a rear frustum boundary;
- TopPadding is a Y-axis distance between a top of the center participant panel and a top frustum boundary
- BottomPadding is the Y-axis distance between the front edge and a bottom edge of the side participant panel and a bottom frustum boundary;
- SidePadding is the X-axis distance between the front edges of side participant panels and a side frustum boundary;
- Height is the Y-axis distance of a virtual camera from the Z-axis;
- Distance is the Z-axis distance of the virtual camera from the center participant panel;
- Angle is an angle of the side participant panels with respect to the X-axis; and
- PanelAspectRatio is a width to height ratio of the participant panels;

rendering the projection frustum in the viewport;

displaying the rendered frustum in the single user interface window;

displaying the first participant panel in an orthographic presentation relative to the user interface window, where the angle of the first participant panel with respect to the X-axis is zero;

displaying the second participant panel in an orthographic presentation relative to the user interface window, where the angle of the second participant panel with respect to the X-axis is zero;

displaying the third participant panel between the first participant panel and the second participant panel such that the third participant panel is displayed in an orthographic presentation relative to the user interface window, where the angle of the third participant panel with respect to the X-axis is zero;

receiving a trigger event to display the first participant panel and the second participant panel with perspective relative to the user interface window; and responsive to receiving the trigger event:
- displaying the first participant panel with perspective relative to the user interface window and angled towards the horizontal center of the user interface window, by increasing the angle of the first participant panel with respect to the X-axis from zero to a final non-zero value;
- displaying the second participant panel with perspective relative to the user interface window and angled towards the horizontal center of the user interface window by increasing the angle of the second participant panel with respect to the X-axis from zero to a final non-zero value.

UNITED STATES PATENT AND TRADEMARK OFFICE
CERTIFICATE OF CORRECTION

| | | Page 1 of 2 |
|---|---|---|
| PATENT NO. | : 7,865,834 B1 | |
| APPLICATION NO. | : 10/877509 | |
| DATED | : January 4, 2011 | |
| INVENTOR(S) | : Marcel van Os et al. | |

It is certified that error appears in the above-identified patent and that said Letters Patent is hereby corrected as shown below:

In column 2, line 42, delete "layout" and insert -- layout. --, therefor.

In column 4, line 32, delete "user;" and insert -- user --, therefor.

In column 6, line 58, after "giLoadIdentity()" insert -- ; --.

In column 13, lines 6-7, in Claim 8, after "$FrustumTop = \frac{(PanelHeight - PanelWidth * (TopPadding - Height)) * FrustumNear}{PanelWidth * Distance}$" insert -- ; --.

In column 13, lines 8-9, in Claim 8, after
"$FrustumTop = \frac{(PanelHeight - PanelWidth * (TopPadding - Height)) * FrustumNear}{PanelWidth * Distance}$"
insert -- $FrustumBottom = \frac{-(Height + BottomPadding) * FrustumNear}{Distance - ZGap - sin(Angle)}$ ; --.

In column 13, line 49, in Claim 9, after
"$FrustumNear = PanelWidth * (Distance - sin(Angle) - NearPadding)$" insert -- ; --.

In column 13, lines 51-52, in Claim 9, after
"$FrustumRight = \frac{(HalfGap + XGap + cos(Angle) + SidePadding) * FrustumNear}{Distance - sin(Angle)}$" insert -- ; --.

In column 13, lines 55-58, in Claim 9, after
"$FrustumTop = \frac{(PanelHeight - PanelWidth * (TopPadding - Height)) * FrustumNear}{PanelWidth * Distance}$" insert -- ; --.

Signed and Sealed this
Fourteenth Day of February, 2012

David J. Kappos
*Director of the United States Patent and Trademark Office*

CERTIFICATE OF CORRECTION (continued)

U.S. Pat. No. 7,865,834 B1

In column 13, lines 59-60, in Claim 9, after

" $FrustumBottom = \dfrac{-(Height + BottomPadding) * FrustumNear}{Distance - sin(Angle)}$ " insert -- ; --.

In column 14, line 9, in Claim 9, delete "boundary" and insert -- boundary; --, therefor.

In column 18, line 14, in Claim 24, delete

" $FrustumFar = PanelWidth * (Distance - sin(Angle) - NearPadding)$ " and insert -- $FrustumFar = PanelWidth * (Distance * FarPadding);$ --.

In column 18, lines 18-19, in Claim 24, after

" $FrustumRight = \dfrac{(HalfGap + XGap + cos(Angle) + SidePadding) * FrustumNear}{Distance - sin(Angle)}$ " insert -- ; --.

In column 18, lines 25-26, in Claim 24, after

" $FrustumBottom = \dfrac{-(Height + BottomPadding) * FrustumNear}{Distance - sin(Angle)}$ " insert -- ; --.

In column 18, line 44, in Claim 24, delete "boundary" and insert -- boundary; --, therefor.

In column 18, line 53, in Claim 24, delete "the of side" and insert -- of the side --, therefor.

In column 20, line 14, in Claim 25, delete "boundary" and insert -- boundary; --, therefor.